(12) United States Patent
Park et al.

(10) Patent No.: US 9,381,959 B2
(45) Date of Patent: Jul. 5, 2016

(54) RUBBER CRAWLER HAVING METAL CORE FOR IMPROVEMENT OF WHEEL SEPARATION AND DURABILITY

(75) Inventors: Jung Ho Park, Busan (KR); Kyu Jin Lee, Ulsan (KR)

(73) Assignee: DONG-IL RUBBER BELT CO., LTD. (KR)

( * ) Notice: Subject to any disclaimer, the term of this patent is extended or adjusted under 35 U.S.C. 154(b) by 360 days.

(21) Appl. No.: 13/574,733

(22) PCT Filed: Dec. 13, 2010

(86) PCT No.: PCT/KR2010/008883
§ 371 (c)(1),
(2), (4) Date: Jul. 23, 2012

(87) PCT Pub. No.: WO2011/093590
PCT Pub. Date: Aug. 4, 2011

(65) Prior Publication Data
US 2012/0286566 A1    Nov. 15, 2012

(30) Foreign Application Priority Data

Jan. 26, 2010  (KR) .................. 10-2010-0006985

(51) Int. Cl.
*B62D 55/24*     (2006.01)
*E02F 9/02*      (2006.01)

(52) U.S. Cl.
CPC ............. *B62D 55/244* (2013.01); *E02F 9/02* (2013.01)

(58) Field of Classification Search
CPC ........ B62D 55/00; B62D 55/18; B62D 55/24; B62D 55/242; B62D 55/244

USPC ......... 305/165, 167, 170, 171, 172, 173, 174, 305/175, 176, 177

See application file for complete search history.

(56) References Cited

U.S. PATENT DOCUMENTS 5,522,654 A  *  6/1996  Katoh ........................ 305/174
7,413,268 B2 *  8/2008  Kato et al. .................. 305/172

FOREIGN PATENT DOCUMENTS

| DE | 202006013452 U1 | 3/2008 | |
|---|---|---|---|
| EP | 1864892 A1 | 3/2005 | |
| EP | 2039597 A1 | 7/2007 | |
| EP | 1864892 A1 * | 12/2007 | ............. B62D 55/24 |
| EP | 2039597 A1 * | 3/2009 | ........... B62D 55/253 |
| JP | 06-087473 | 3/1994 | |

(Continued)

OTHER PUBLICATIONS

International Search Report mailed Jul. 28, 2011 for International application No. PCT/KR2010/008883.

(Continued)

*Primary Examiner* — Jason Bellinger
(74) *Attorney, Agent, or Firm* — Swanson & Bratschun, L.L.C.

(57) ABSTRACT

A rubber crawler having a metal core which comprises metal core extensions formed at predetermined intervals along the lengthwise direction of the metal core of the rubber crawler, thereby avoiding the phenomenon of wheel separation which occurs during crawler operation Wherein the metal core extensions are assembled on the mutually opposite surfaces of which are inclined at a predetermined angle, and the overlapped portion (center portion) surfaces of the metal core extensions are formed to have an angle of inclination to each other, thereby supporting the X axis, Y axis, and Z axis displacements.

2 Claims, 6 Drawing Sheets

(56) References Cited

FOREIGN PATENT DOCUMENTS

| | | |
|---|---|---|
| JP | 1996-026154 A | 1/1996 |
| JP | 08-198154 | 8/1996 |
| JP | 1997-226639 A | 9/1997 |
| JP | 2005-212741 A | 8/2005 |
| JP | 2009-166710 | 7/2009 |
| KR | 10-0322334 | 8/2002 |

OTHER PUBLICATIONS

European Search Report for EP 10844814.3, mailed Aug. 7, 2013, 7 pages.

* cited by examiner

Figure 1   *Prior Art*
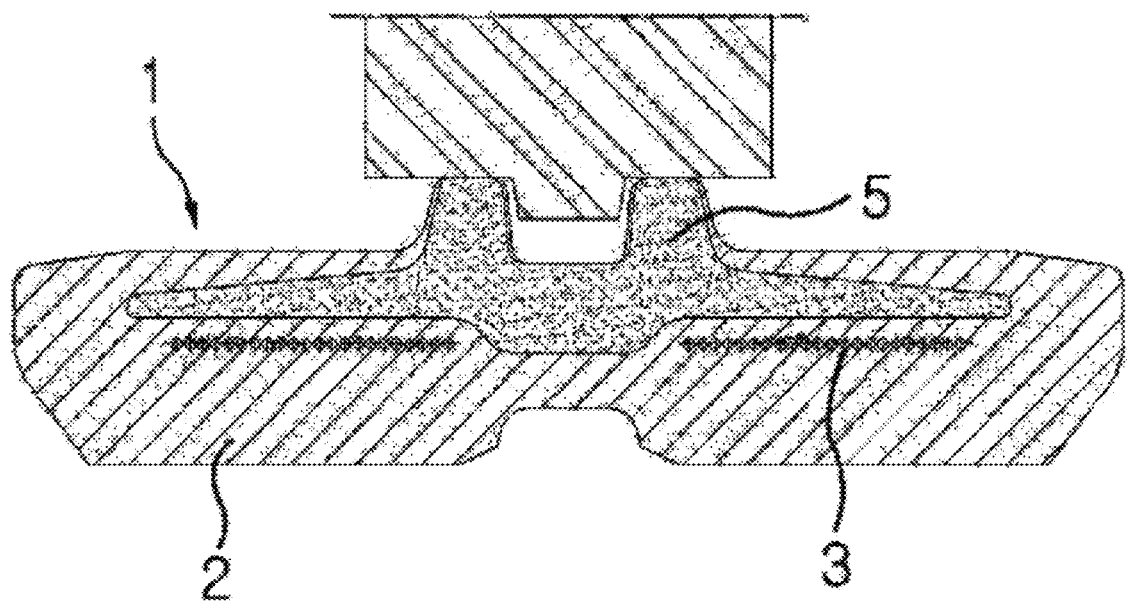
Figure 2   *Prior Art*
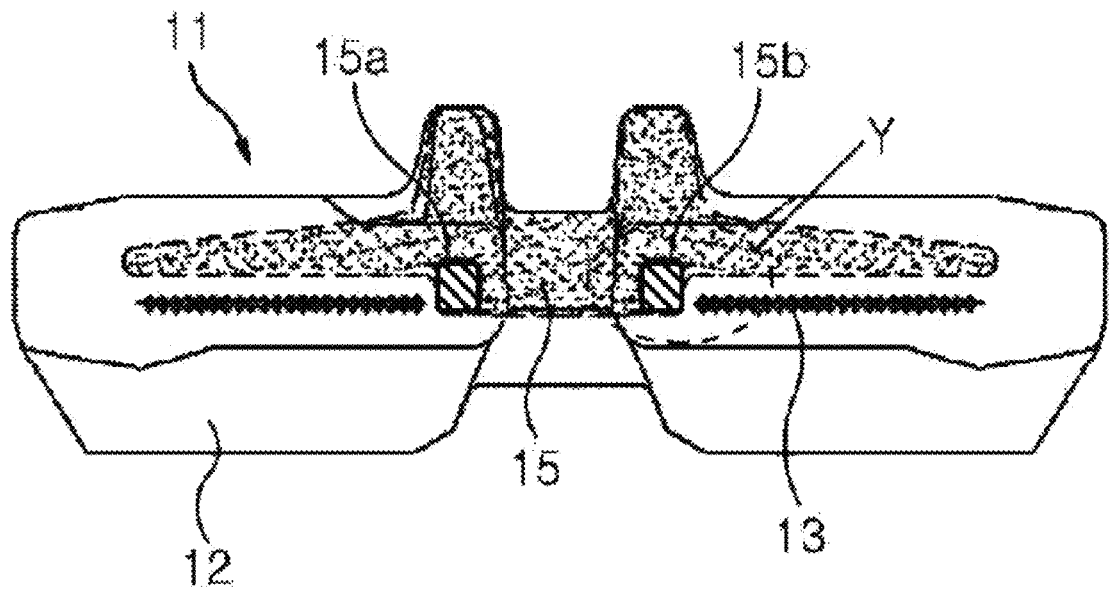

ically generated in the up and down direction as well as the transverse direction of the crawler 11, there is a problem that the wheel separation preventing function is not performed smoothly.

RUBBER CRAWLER HAVING METAL CORE FOR IMPROVEMENT OF WHEEL SEPARATION AND DURABILITY

CROSS-REFERENCE(S) TO RELATED APPLICATIONS

The present invention is a national phase entry under 35 U.S.C. 371 of International Application No. PCT/KR2010/008883, filed on Dec. 13, 2010, which claims the benefit of Korean Patent Application No. 10-2010-0006985, filed on Jan. 26, 2010. The disclosures of said applications are incorporated by reference herein.

TECHNICAL FIELD

The present invention relates to a rubber crawler, and more particularly, to a rubber crawler having a metal core for improvement of wheel separation and durability, in which metal core extensions are formed at predetermined intervals along the lengthwise direction of the metal core of the rubber crawler so as to avoid the phenomenon of wheel separation which occurs during crawler operation and minimize lug breakage due to foreign substances and also minimize bend fatigue, metal core exposure and breakage of a tread portion, thereby enhancing the durability performance.

BACKGROUND ART

Generally, a crawler formed of rubber, a metal core and a steel cord is called a caterpillar track which is used as a wheel component in agricultural or industrial machineries such as a combine, a motor-lorry, an excavator and a snowplow.

The crawler enhances operation efficiency on the soft ground and also allows environmentally friendly movement and work. Particularly, the crawler is used as a substitute for a steel chain in an excavator in order to improve noise and vibration, thereby enhancing a comfortable ride.

FIG. 1 is a longitudinal cross-sectional view of a conventional rubber crawler in which a metal core is embedded. Referring to FIG. 1, the crawler 1 includes a lug 2 which is formed to protrude on an external side surface and grounded on the ground; a steel cord 3 as a tension member which is disposed internally for enduring compressive load and driving load of a tracked vehicle and maintaining a sufficient rigidity and tensile strength; and a metal core 5 which is embedded within the steel cord so as to transfer the driving force of an engine while maintaining the shape of the crawler 1.

Herein, since the metal core 5 formed into a single body has not a separate structure for reinforcing the rigidity, the whole rigidity of the crawler 1 is lowered and also the crawler 1 may be easily separated by external shock applied from the side surface, thereby causing wheel separation.

In order to solve the problem, there has been proposed a new structure of the metal core for improving the wheel separation. FIG. 2 is a cross-sectional view of a conventional crawler in which an improved metal core is inserted. Referring to FIG. 2, the crawler includes a lug 12 which is formed to protrude on an external side surface; a steel cord 13 which is disposed therein; and a metal core 15 which is integrally embedded within the steel cord 13.

In the conventional crawler for improving the wheel separation, adjacent metal core extensions 15a and 15b for preventing the wheel separation support each other against the external force generated in the transverse direction of the crawler 11. However, when the external force is simulta- Further, in the conventional metal core structure for preventing the wheel separation, as shown in the Y portion of FIG. 2, the metal core extensions 15a and 15b for preventing the wheel separation are not located at the upper side of an insertion portion of the steel cord 13, and the lower portions of the metal core extensions 15a and 15b are located on the bottom surface of the metal core 15.

Furthermore, since the metal core extensions 15a and 15b are not located completely at the internal surface of the lug 12, there is other problem of being weak in the bend fatigue, the metal core exposure due to foreign substances and the breakage of a tread portion.

DISCLOSURE

Technical Problem

An object of the present invention is to provide a rubber crawler having a metal core for improvement of wheel separation and durability, which can support a Z axis which has the largest displacement as well as X and Y axes, thereby improving the wheel separation and minimizing the Z axis displacement upon the interference of the foreign substances, and thus which can minimize the lug breakage of the crawler due to the foreign substances, thereby minimizing the wheel separation and the durability.

Another object of the present invention is to provide a rubber crawler having a metal core for improvement of wheel separation and durability, which can minimize the metal core exposure and the breakage of the tread portion due to the foreign substances and bend fatigue.

Yet another object of the present invention is to provide a rubber crawler having a metal core for improvement of wheel separation and durability, in which a thick rubber layer is formed between metal core extension and steel cord so as to absorb shock when the metal core is bent, thereby minimizing the breakage of the steel cord and the tread portion.

Yet another object of the present invention is to provide a rubber crawler having a metal core for improvement of wheel separation and durability, which has a wide external bending surface of the metal core extension so as to disperse stress locally applied when the metal core is bent, thereby minimizing the separation of the metal core and the crawler.

Yet another object of the present invention is to provide a rubber crawler having a metal core for improvement of wheel separation and durability, in which a lower surface of the metal core extension and a bottom surface of the metal core form a predetermined angle in the lengthwise direction of the crawler so as to minimize the stress generated when the metal core is bent, thereby minimizing the breakage of the steel cord and the tread portion.

Technical Solution

To achieve the object of the present invention, the present invention provides a rubber crawler having a metal core for improvement of wheel separation and durability, including a lug which is formed to protrude on an external side surface and grounded on the ground; a steel cord which is disposed internally for enduring compressive load and driving load of a tracked vehicle; a metal core which is embedded within the steel cord so as to transfer the driving force of an engine; and metal core extensions which are embedded along both lengths on the basis of the center portion of the metal core so as to prevent wheel separation of the metal core, wherein mutually opposite surfaces of the metal core extensions are inclined at a predetermined angle, and surfaces of overlapped portions (center portions) of the metal core extensions are formed to have an inclined angle with respect to each other, thereby supporting X axis, Y axis, and Z axis displacements.

Preferably, the overlapped portion (center portion) of the metal core extension is disposed to be offset from a center portion of a guide of the metal core toward an end of the metal core.

Preferably, the overlapped portion (center portion) of the metal core extension is coincided with an end of the steel cord, or located inside the steel cord.

Preferably, a lower surface of the metal core extension is coincided with the bottom surface of the metal core, or spaced apart from the bottom surface of the metal core.

Preferably, opposite surfaces of the metal core extensions form an angle of 45 degrees.

Preferably, at least two pairs of the surfaces of the overlapped portions (center portions) of the metal core extensions have the same inclined direction.

Preferably, an external bending surface of the metal core extension is formed to be wider, thereby dispersing stress locally applied when the metal core is bent and minimizing separation of the metal core and the crawler.

Advantageous Effects

According to the rubber crawler having the metal core for improvement of wheel separation and durability, as described above, since the metal core extensions are formed at predetermined intervals along the lengthwise direction of the metal core of the rubber crawler, the present invention has some advantages as follows:

Firstly, since the Z axis which has the largest displacement as well as the X and Y axes are supported, it is possible to improve the wheel separation and minimize the Z axis displacement upon the interference of the foreign substances, thereby minimizing the lug breakage of the crawler due to the foreign substances.

Secondly, since the surfaces of the overlapped portions (center portions) of the metal core extensions are formed at the upper surface of the insertion portion of the steel cord, it is possible to minimize the metal core exposure and the breakage of the tread portion due to the foreign substances and bend fatigue.

Thirdly, since the thick rubber layer can be formed between the metal core extension and the steel cord so as to absorb shock when the metal core is bent, it is possible to minimize the breakage of the steel cord and the tread portion.

Fourthly, since the external bending surface of the metal core extension is formed to be wider, it is possible to disperse the stress locally applied when the metal core is bent, thereby minimizing the separation of the metal core and the crawler.

Fifthly, since the lower surface of the metal core extension and the bottom surface of the metal core form a predetermined angle in the lengthwise direction of the crawler so as to minimize the stress generated when the metal core is bent, it is possible to minimize the breakage of the steel cord and the tread portion.

DESCRIPTION OF DRAWINGS

FIG. 1 is a longitudinal cross-sectional view of a conventional rubber crawler in which a metal core is embedded.

FIG. 2 is a cross-sectional view of a conventional crawler in which a metal core for improvement of wheel separation is inserted.

DETAILED DESCRIPTION OF THE EMBODIMENTS

Hereinafter, the embodiments of the present invention will be described in detail with reference to accompanying drawings. Hereinafter, the terms and words used in the description as described below are not limited to the typical or dictionary definition, and they can be interpreted as proper meanings and definitions consistent with the technical ideas.

Figure 3:
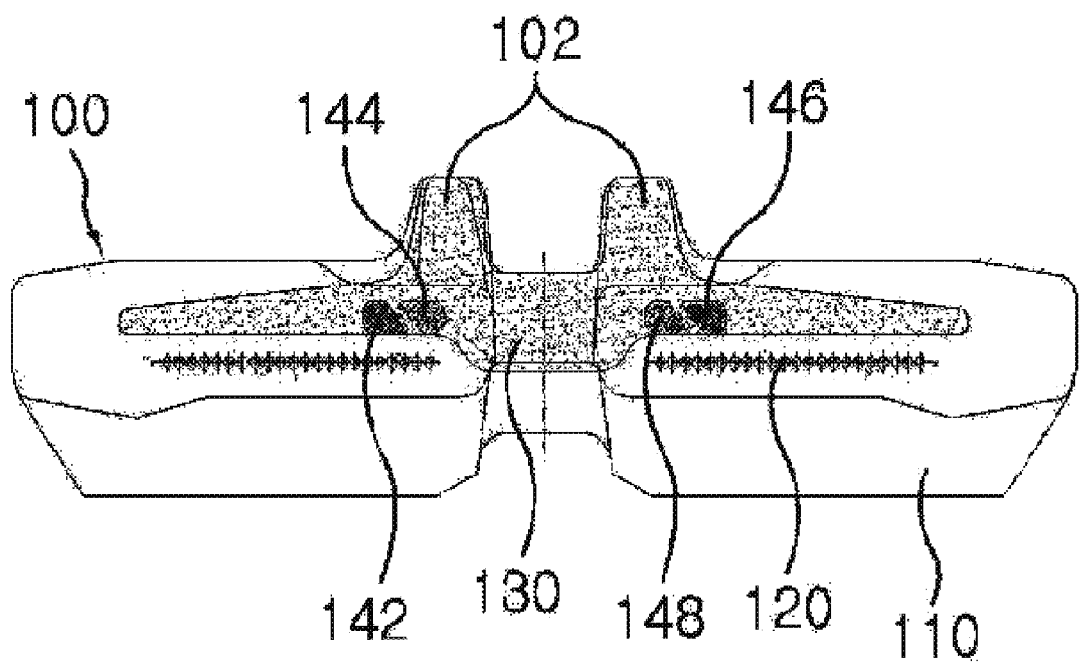
FIG. 3 is a front cross-sectional view of a rubber crawler having a metal core for improvement of wheel separation and durability according to an embodiment of the present invention.
Figure 4:
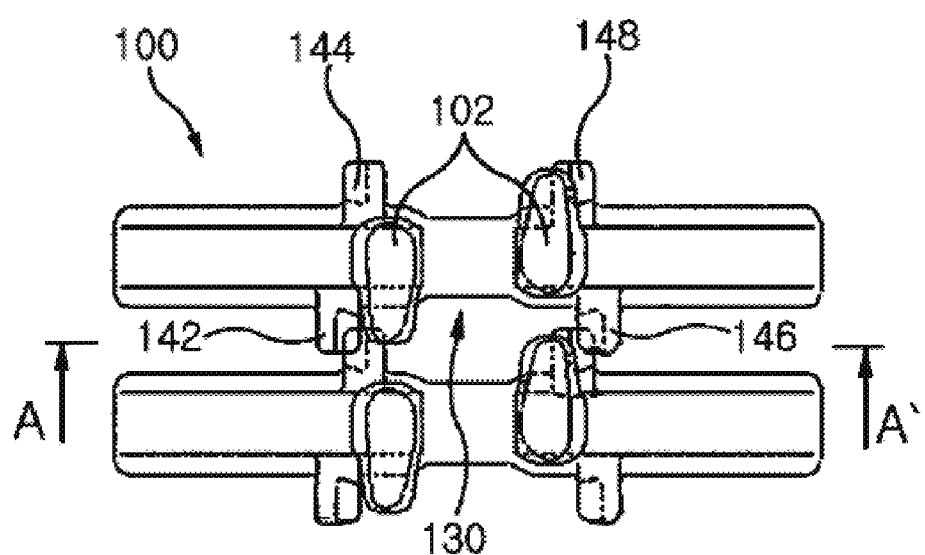
FIG. 4 is a plane view and a partially enlarged view of the rubber crawler of FIG. 3.
Figure 5:
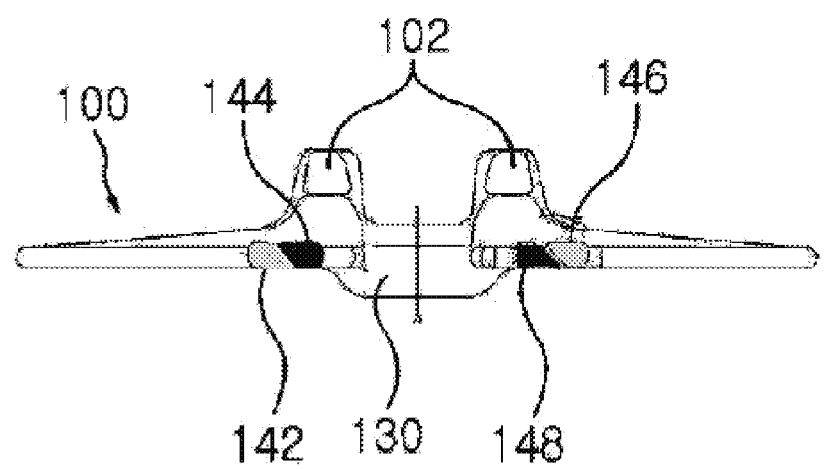
FIG. 5 is a cross-sectional view taken along a line A-A' of FIG. 4 and an enlarged view showing a case that the metal core extensions are further added.

FIG. 3 is a front cross-sectional view of a rubber crawler having a metal core for improvement of wheel separation and durability according to an embodiment of the present invention, FIG. 4 is a plane view and a partially enlarged view of the rubber crawler of FIG. 3, and FIG. 5 is a cross-sectional view taken along a line A-A' of FIG. 4 and an enlarged view showing a case that the metal core extensions are further added.

Referring to FIGS. 3 to 5, the rubber crawler 100 of the present invention includes a lug 110, a steel cord 120, a metal core 130 and metal core extensions 142, 144, 146 and 148.

The lug 110 is formed to protrude on an external side surface of the crawler 100 and grounded on the ground, and the steel cord 120 is disposed in the crawler 100 so as to endure compressive load and the driving load of a tracked vehicle and maintain a sufficient rigidity and tensile strength even when using for long terms.

Further, the metal core 130 is embedded within the steel cord 120 so as to maintain the shape of the crawler 100 and transfer the driving force of an engine.

In the present invention, the metal core extensions 142, 144, 146 and 148 are embedded along both lengths on the basis of the center portion of the metal core so as to be alternate with each other, thereby preventing wheel separation of the metal core 130.

Referring to FIG. 5, in the metal core extensions 142, 144, 146 and 148, opposite surfaces thereof form an angle of 15 to 80 degrees, more preferably 45 degrees. The surfaces of the overlapped portions (center portions) of the metal core extensions 142, 144, 146 and 148 are formed to have an inclined angle to each other, thereby supporting X axis, Y axis, and Z axis displacements. Herein, the X axis is formed in a horizontal direction of the metal core 130 as shown in FIG. 4, the Y axis is formed in the lengthwise direction of the crawler to be orthogonal to the X axis, and the Z axis is orthogonal to the X axis and formed vertically to the upper direction of the metal core 130.

As shown in FIG. 5, in the inclined direction of the surfaces of the overlapped portions (center portions) of the metal core extensions 142, 144, 146 and 148, at least two pairs thereof are formed in the same direction.

Therefore, the metal core 130 supports the Z axis which has the largest displacement as well as X and Y axes, thereby improving the wheel separation. Further, when the foreign substances are interfered between the crawler 100 and the machinery, the metal core 130 reduces the Z axis displacement, thereby minimizing the breakage of the lug 110 of the crawler.

Figure 6:
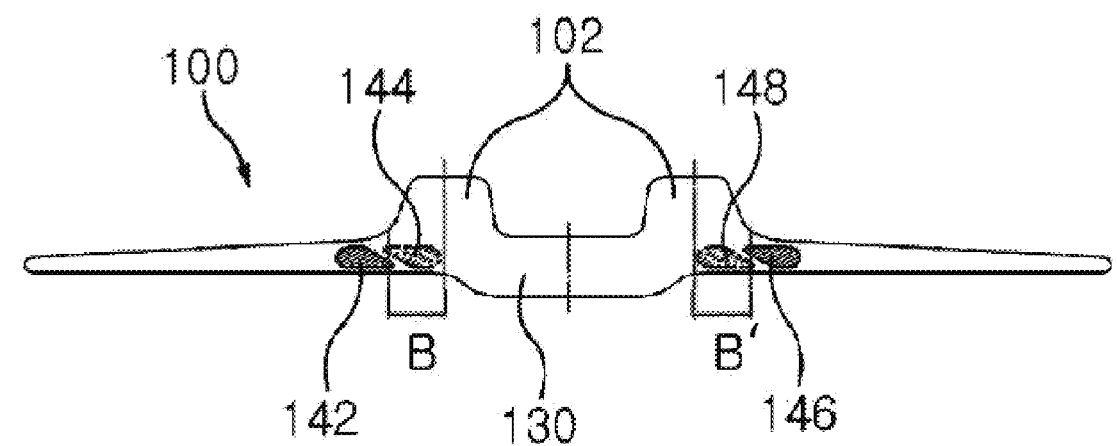
FIG. 6 is a front schematic view showing that a surface of an overlapped portion (center portion) of the metal core extension is offset from the center portion of a guide of the metal core toward an end of the metal core according to the present invention.
Figure 7:
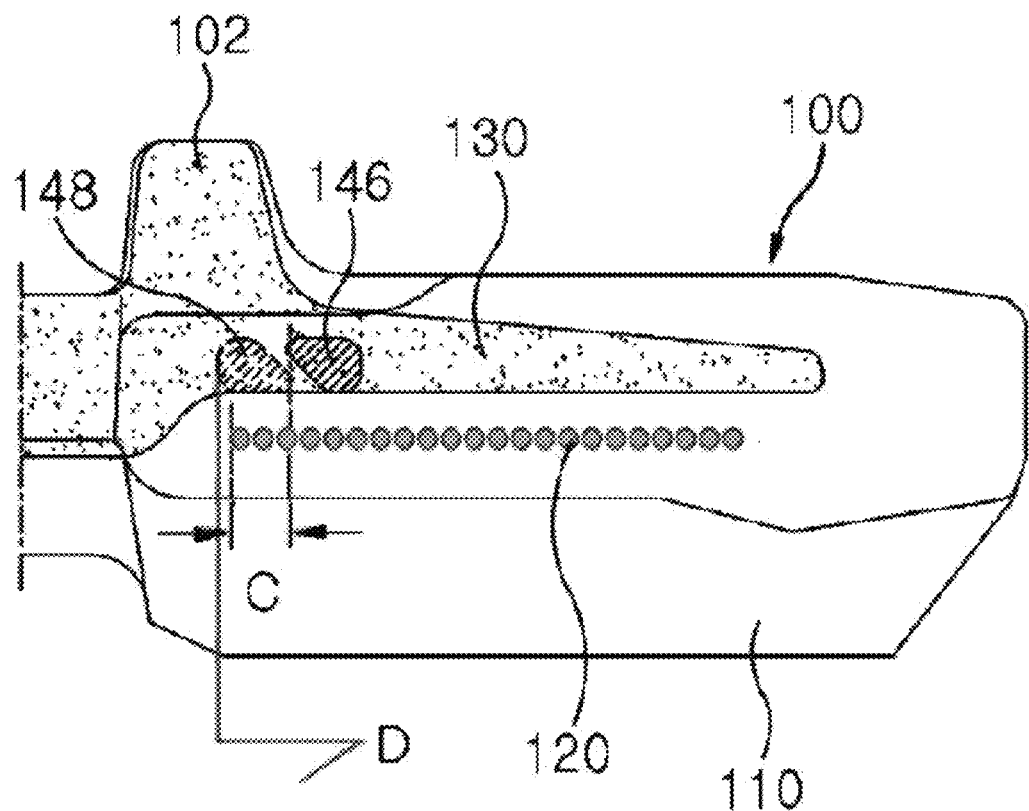
FIG. 7 is a partially front cross-sectional view showing that the overlapped portion (center portion) of the metal core extension is coincided with an end of the steel cord or located to the inside of the steel cord.

FIG. 6 is a front schematic view showing that the surface of the overlapped portion (center portion) of the metal core extension is offset from the center portion of a guide of the metal core toward an end of the metal core according to the present invention, and FIG. 7 is a partially front cross-sectional view showing that the overlapped portion (center portion) of the metal core extension is coincided with an end of the steel cord or located in the steel cord.

As indicated in "B" and "B'" of FIG. 6, the width-direction overlapped portion (center portion) of the metal core extension 142, 144, 146, 148 is located at the center portion of a guide 102 of the crawler 100 so as to be offset toward an end of the metal core 130. And as indicated in "C" of FIG. 7, the width-direction overlapped portion (center portion) of the metal core extension 142, 144, 146, 148 is coincided with an end of the steel cord 120 or located in the steel cord 120 and thus located at the upper surface of an insertion portion of the steel cord 120. Therefore, it is possible to minimize exposure of the metal core 130 and breakage of a tread portion of the crawler 100 due to continuous bend fatigue and foreign substances.

Further, as indicated in "D" of FIG. 7, since the metal core extensions 146 and 148 are located at the upper inner side portion of the lug 110 along the width direction of the lug 110, it is possible to minimize the exposure of the metal core 130 and the breakage of the tread portion of the crawler 100 due to the continuous bend fatigue and the foreign substances.

Figure 8:
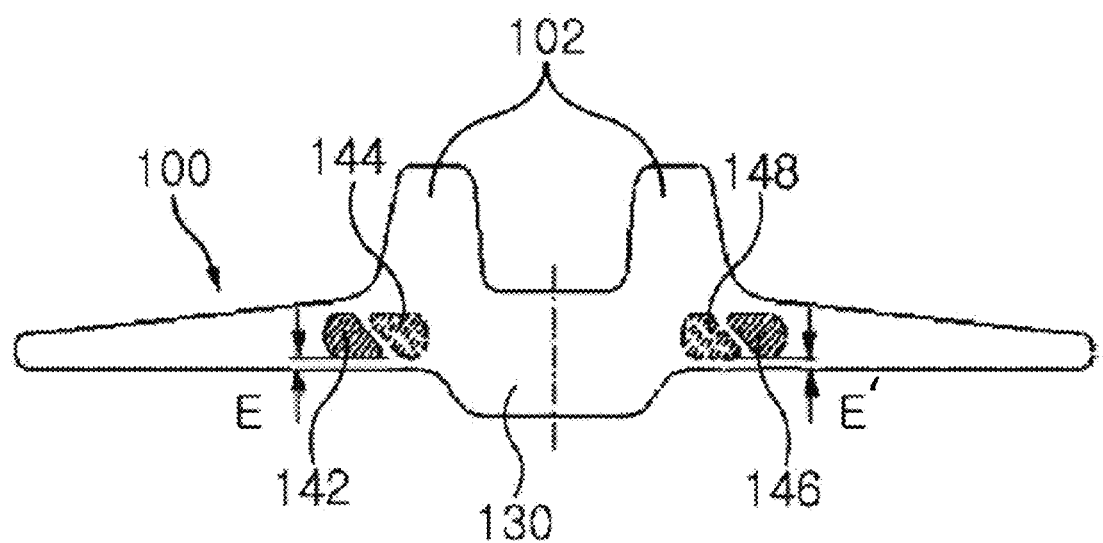
FIG. 8 is a front schematic view showing that the lower surface of the metal core extension is coincided with the bottom surface of the metal core or spaced apart from the bottom surface of the metal core.

FIG. 8 is a front schematic view showing that the lower surfaces of the metal core extensions are coincided with the bottom surface of the metal core or spaced apart from the bottom surface of the metal core. As indicated in "E" and "E'" of FIG. 8, the lower surfaces of the metal core extensions 142, 144, 146 and 148 are coincided with the bottom surface of the metal core 130 or spaced apart from the bottom surface of the metal core 130. Therefore, a thick rubber layer can be formed between the metal core extension 142, 144, 146, 148 and the steel cord 120, and thus the rubber layer functions as a buffer for absorbing shock when the metal core 130 is bent, thereby minimizing the breakage of the steel cord 120 and the tread portion.

Figure 9:
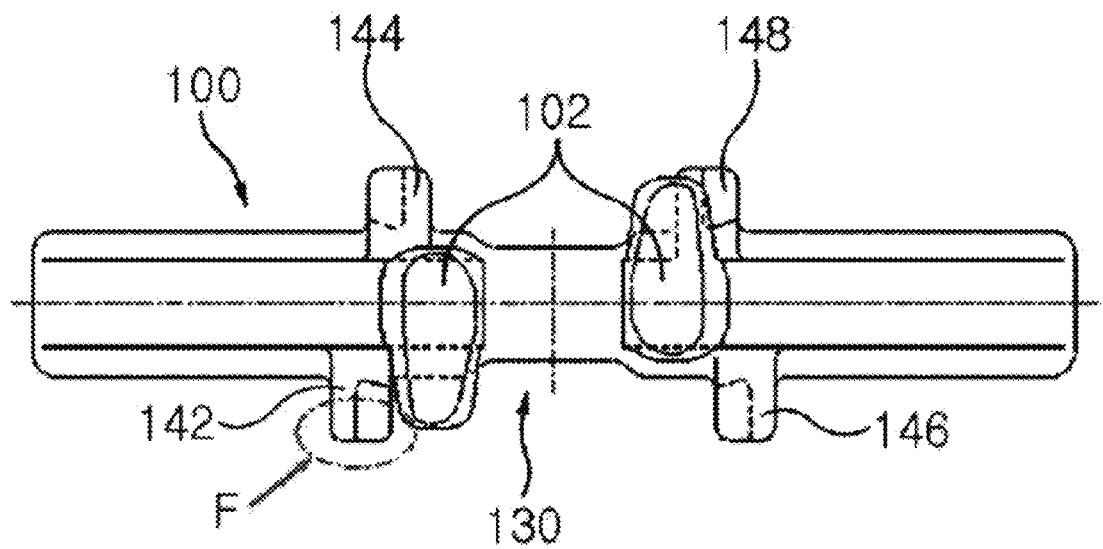
FIG. 9 is a plane view showing the metal core of the rubber crawler according to the present invention.

FIG. 9 is a plane view showing the metal core of the rubber crawler according to the present invention. As indicated in "F" of FIG. 9, the external bending surface of the metal core extension 142 is formed to be wider, so that the stress applied locally when the metal core 130 is bent can be dispersed, thereby minimizing the separation of the metal core 130 and the crawler 100.

Figure 10:
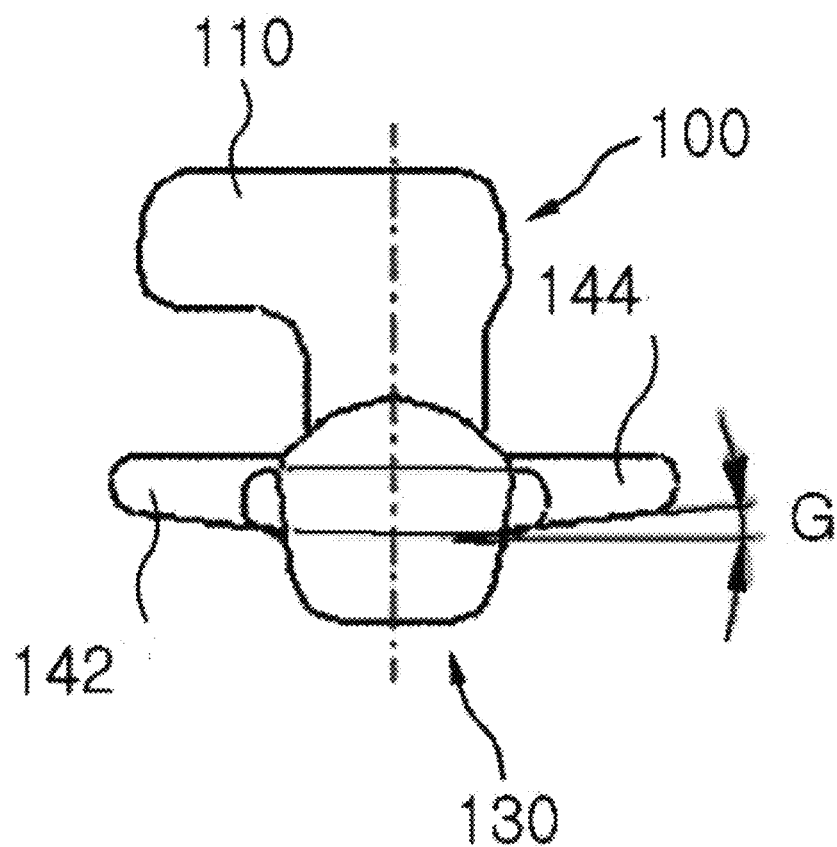
FIG. 10 is a plane view showing that the lower surface of the metal core extension and the bottom surface of the metal core form a predetermined angle in the lengthwise direction of the crawler according to the present invention.
Figure 11:
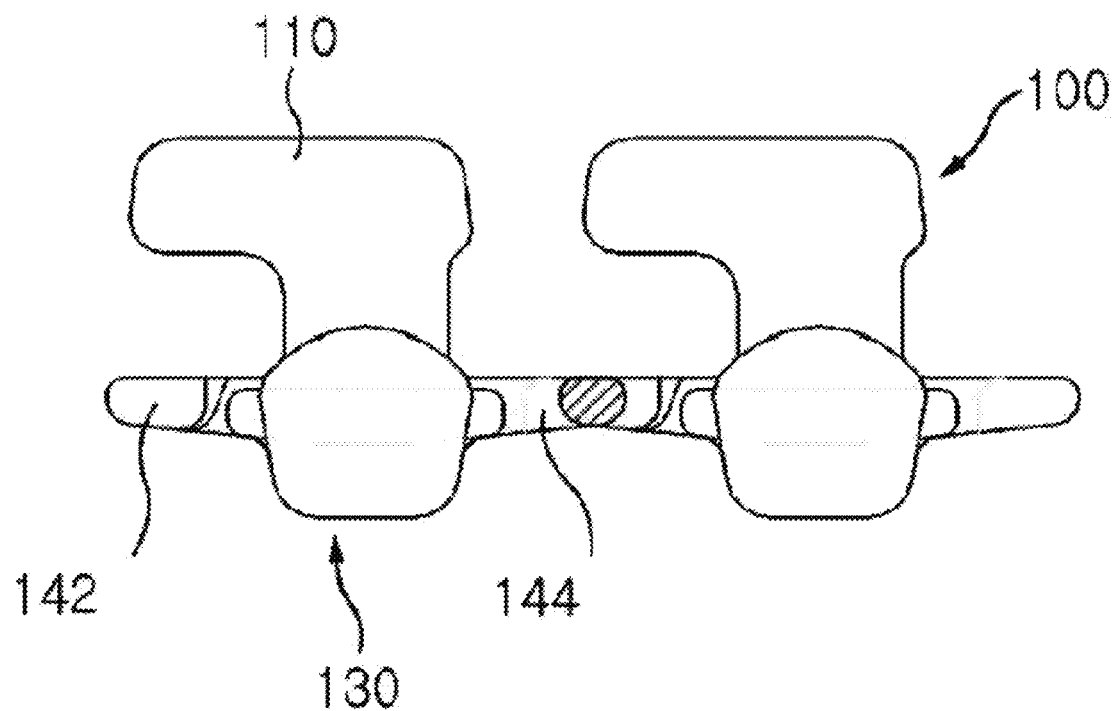
FIG. 11 is a plane view showing the metal core of the crawler according to the present invention.

FIG. 10 is a plane view showing that the lower surface of the metal core extension and the bottom surface of the metal core form a predetermined angle in the lengthwise direction of the crawler according to the present invention, and FIG. 11 is a plane view continuously showing the metal cores in the rubber crawler according to the present invention.

As indicated in "G" of FIG. 10, the lower surface of the metal core extension 142, 144 and the bottom surface of the metal core 130 form a predetermined angle in the lengthwise direction of the crawler 100 in order to minimize the stress generated when the metal core 130 is bent, thereby minimizing the breakage of the steel cord 120 and the tread portion.

While the present invention has been described with respect to the specific embodiments, it will be apparent to those skilled in the art that various changes and modifications may be made without departing from the spirit and scope of the invention as defined in the following claims.

The invention claimed is:

1. A rubber crawler comprising:
a rubber crawler loop comprising a plurality of lugs formed in an exterior surface of the rubber crawler loop, wherein a line between a center point of adjacent lugs defines a lengthwise direction around the rubber crawler loop;
a cord embedded within the rubber crawler loop;
a plurality of cores embedded within the rubber crawler loop in a row around the lengthwise direction of the rubber crawler loop, wherein each core comprises;
a left front core extension extending from a front side of the core parallel to the lengthwise direction;
a right front core extension extending from the front side of the core parallel to the lengthwise direction, wherein the left front core extension comprises a planar left front contact surface which is inclined transverse to the lengthwise direction, and wherein the right front core extension comprises a planar right front contact surface which is inclined transverse to the lengthwise direction;
a left rear core extension extending from a rear side of the core parallel to the lengthwise direction; and
a right rear core extension extending from the rear side of the core parallel to the lengthwise direction, wherein the left rear core extension comprises a planar left rear contact surface which is inclined transverse to the lengthwise direction, and wherein the right rear core extension comprises a planar right rear contact surface which is inclined transverse to the lengthwise direction,
and wherein a first core and an adjacent second core of the plurality of cores contact each other solely through contact between the left front contact surface of the first core and the left rear contact surface of the second core and further through contact between the right front contact surface of the first core and the right rear contact surface of the second core.

2. The rubber crawler according to claim 1, wherein each inclined contact surface of the core extensions forms an angle of 45 degrees transverse the lengthwise direction.

* * * * *